(12) United States Patent
Torpin et al.

(10) Patent No.: US 7,630,938 B2
(45) Date of Patent: Dec. 8, 2009

(54) FLEXIBLE BILLING ADJUSTMENT SYSTEM

(75) Inventors: Tom Torpin, Ledgewood, NJ (US);
Hermanta Ranjan Panda, Edison, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 973 days.

(21) Appl. No.: 11/095,141

(22) Filed: Mar. 31, 2005

(65) Prior Publication Data
US 2006/0224507 A1 Oct. 5, 2006

(51) Int. Cl.
G06Q 40/00 (2006.01)
G06Q 30/00 (2006.01)
(52) U.S. Cl. .......................................... 705/40; 705/26
(58) Field of Classification Search ................... 705/26, 705/74
See application file for complete search history.

(56) References Cited

U.S. PATENT DOCUMENTS

| | | | |
|---|---|---|---|
| 4,939,352 A | 7/1990 | Sunyich | |
| 5,978,780 A | 11/1999 | Watson | |
| 6,006,205 A | 12/1999 | Loeb et al. | |
| 6,032,134 A | 2/2000 | Weissman | |
| 6,353,811 B1 | 3/2002 | Weissman | |
| 6,360,209 B1 | 3/2002 | Loeb et al. | |
| 7,069,249 B2 * | 6/2006 | Stolfo et al. | 705/74 |
| 7,177,825 B1 * | 2/2007 | Borders et al. | 705/26 |

* cited by examiner

*Primary Examiner*—F. Zeender
*Assistant Examiner*—Denisse Ortiz Roman
(74) *Attorney, Agent, or Firm*—Alston & Bird LLP

(57) ABSTRACT

The present invention relates to flexible billing systems that can be used within the transportation industry to facilitate credit card billing adjustments to credit cards that were previously used by customers to pay for one or more shipping charges. In particular, the present invention provides a system or tool that enables a user to easily access a detailed billing history of credit card transactions in order to apply full or partial credit card billing adjustments that specifically correspond to individual transactions included in the history of charges associated with a particular item or shipment.

32 Claims, 25 Drawing Sheets

```
22222222         CREDIT CARD ADJUSTMENTS SYSTEM              MM/DD/YY
                        ADJUSTMENTS                          HH:MM:SS
                              ╲
                               412
TRACKING NUMBER: _____
                                  414
NOTIFICATION NUMBER: 1234567890364̲1̲╱

OPT  TRACKING NUMBER
___  _____
___  _____
___  _____
___  _____
___  _____
___  _____
___  _____
___  _____
___  _____

OPTION:   S=SELECT  I=INQUIRY  A=APPROVE  D=DELETE   R=REVERSE
PF1=HELP  PF3=PREV SCR  PF7=BACK  PF8=FRWD  PFV=APRV ID    PF12=MAIN MENU
```

```
22222222        CREDIT CARD ADJUSTMENTS SYSTEM              MM/DD/YY
                        ADJUSTMENTS                         HH:MM:SS
               ⎫
            410⎬
               ⎭

TRACKING NUMBER:  _____

NOTIFICATION NUMBER: 12345678903641  ⎯⎯ 414

OPT   TRACKING NUMBER
 s    1Z123456XX12345678 ⎯⎯ 412
 _    1Z123456XX98765432 ⎯⎯ 412
 _    _____
 _    _____
 _    _____
 _    _____
 _    _____
 _    _____
 _    _____

OPTION:   S=SELECT   I=INQUIRY  A=APPROVE  D=DELETE   R=REVERSE
PF1=HELP  PF3=PREV SCR  PF7=BACK  PF8=FRWD  PFV=APRV ID   PF12=MAIN MENU
```

Fig. 4C

| 33333333 | | CREDIT CARD ADJUSTMENTS SYSTEM ADJUSTMENTS | | | | MM/DD/YY HH:MM:SS |
|---|---|---|---|---|---|---|

TRACKING NUMBER: 1Z123456XX12345678 ⟵ 412

420

| | TRANS TYPE | AMOUNT | TRANS DT | LAST ADJ ID | STATUS | CC TYPE | CARD ENDING | REASON CODE |
|---|---|---|---|---|---|---|---|---|
| O | FRT | 16.44 | 02/10/04 | | | MC | 1234 | |
| | ADC | 10.00 | 02/12/04 | | | MC | 1234 | |
| | PDS | 1.46 | 02/12/04 | | | MC | 1234 | |
| | SCC | 5.00 | 02/12/04 | | | MC | 1234 | |

OPTION:  S=SELECT  I=INQUIRY  A=APPROVE  D=DELETE  R=REVERSE
PF1=HELP  PF3=PREV SCR  PF7=BACK  PF8=FRWD  PFV=APRV ID        PF12=MAIN MENU

Fig. 4D

```
44444444          CREDIT CARD ADJUSTMENTS SYSTEM ADJUSTMENTS              MM/DD/YY
                                                                          HH:MM:SS
COUNTRY: US   RRDD: 0727  SHIPPER#: 09602T  COMPANY: XXXXXXXXXXXXXXXXXXXX
SOURCE: UIS   TRANSACTION DATE: MM/DD/YY    ORIGIN ZIP: 12345  DEST ZIP: 98765
ACTUAL WT: 001  BILLED WT: 030  O/S TYPE: _  ZONE: 106
PDT: SPB  CONT: PKG  DLV: 1DA  REF1: RMA # 123    REF2: 123456789

REASON FOR ADJUSTMENT: _____
             PUB        INC                    ADJ      REMAINING
CHARGE DESC  CHARGE     CREDIT    BILLED       AMOUNT   BALANCE
                                  CHARGE
TRANS        13.90      0.00      13.90                 13.90
EVS           2.40      0.00       2.40                  2.40
FSC           0.14      0.00       0.14                   .14
TOTAL        16.44      0.00      16.44                 16.44

CONTACT NAME: _____              PH NUMBER: (___) ___-____
COMMENTS: _____
STATUS: ___  ADJ DT: _____  ADJ ID: _____  APRV BY: _____  APRV DATE: _____

**************THIS LINE WOULD BE FOR ERROR MESSAGES**************
PF1=HELP     PF3=PREV SCR   PF5=RSN CODE   PF7=UP        PF8=DOWN
PFX=PROC ADJ PFY=APPROVE    PFZ=DELETE     PFQ=REVERSE   PF12=MAIN MENU
```

```
44444444          CREDIT CARD ADJUSTMENTS SYSTEM ADJUSTMENTS                    MM/DD/YY
                                                                                HH:MM:SS
COUNTRY: US    RRDD: 0727   SHIPPER#: 09602T  COMPANY: XXXXXXXXXXXXXXXXXXXXXXXX
SOURCE: UIS    TRANSACTION DATE: MM/DD/YY  ORIGIN ZIP: 12345  DEST ZIP: 98765
ACTUAL WT: 001  BILLED WT: 030  O/S TYPE:         ZONE: 106
PDT: SPB  CONT: PKG  DLV: 1DA  REF1:RMA # 123        REF2:123456789

REASON FOR ADJUSTMENT: 007  INCORRECT WEIGHT
              PUB                             ADJ         REMAINING
CHARGE DESC   CHARGE     INC    BILLED        AMOUNT      BALANCE
                         CREDIT CHARGE
TRANS         13.90      0.00   13.90                     13.90
EVS            2.40      0.00    2.40                      2.40
FSC            0.14      0.00    0.14                       .14
TOTAL         16.44      0.00   16.44                     16.44

CONTACT NAME:                                   PH NUMBER: (   )    -
COMMENTS:
STATUS:       ADJ DT:           ADJ ID:         APRV BY:           APRV DATE:

*************THIS LINE WOULD BE FOR ERROR MESSAGES****************
PF1=HELP      PF3=PREV SCR    PF5=RSN CODE    PF7=UP         PF8=DOWN
PFX=PROC ADJ  PFY=APPROVE     PFZ=DELETE      PFQ=REVERSE    PF12=MAIN MENU
```

```
44444444            CREDIT CARD ADJUSTMENTS SYSTEM ADJUSTMENTS              MM/DD/YY
                                                                            HH:MM:SS
COUNTRY: US    RRDD: 0727   SHIPPER#: 09602T  COMPANY: XXXXXXXXXXXXXXXXXXXX
SOURCE: UIS    TRANSACTION DATE: MM/DD/YY  O/S TYPE:    ORIGIN ZIP: 12345  DEST ZIP: 98765
ACTUAL WT: 001  BILLED WT: 030   O/S TYPE:        ZONE: 106
PDT: SPB  CONT: PKG   DLV: 1DA   REF1: RMA # 123        REF2: 123456789

REASON FOR ADJUSTMENT: 007   INCORRECT WEIGHT
                PUB       INC                              ADJ        REMAINING
CHARGE DESC    CHARGE    CREDIT    BILLED   CHARGE        AMOUNT      BALANCE
TRANS          13.90      0.00      13.90                  7.00         6.90
EVS             2.40      0.00       2.40                                2.40
FSC             0.14      0.00       0.14                   .07          .07
TOTAL          16.44      0.00      16.44                  7.07         9.37

CONTACT NAME: _____             PH NUMBER: (___) ___-____
COMMENTS: _____
STATUS: _____  ADJ DT: _____  ADJ ID: _____  APRV BY: _____  APRV DATE: _____

*************THIS LINE WOULD BE FOR ERROR MESSAGES***************
PF1=HELP      PF3=PREV SCR     PF5=RSN CODE    PF7=UP         PF8=DOWN
PFX=PROC ADJ  PFY=APPROVE      PFZ=DELETE      PFQ=REVERSE    PF12=MAIN MENU
```

Fig. 4G

```
44444444        CREDIT CARD ADJUSTMENTS SYSTEM ADJUSTMENTS         MM/DD/YY
                                                                   HH:MM:SS
COUNTRY: US    RRDD: 0727   SHIPPER#: 09602T   COMPANY: XXXXXXXXXXXXXXXXXXXXXX
SOURCE: UIS    TRANSACTION DATE: MM/DD/YY   ORIGIN ZIP: 12345   DEST ZIP: 98765
ACTUAL WT: 001   BILLED WT: 030   O/S TYPE: ___   ZONE: 106
PDT: SPB   CONT: PKG   DLV: 1DA   REF1: RMA # 123   REF2: 123456789

REASON FOR ADJUSTMENT: 026   BILLED FOR VOIDED PACKAGE
                                                                  REMAINING
CHARGE DESC      PUB       INC      BILLED      ADJ
                CHARGE    CREDIT    CHARGE     AMOUNT              BALANCE
TRANS           13.90      0.00     13.90      13.90                0.00
EVS              2.40      0.00      2.40       2.40                0.00
FSC              0.14      0.00      0.14        .14                0.00
TOTAL           16.44                16.44     16.44                0.00

CONTACT NAME: _____    PH NUMBER: (___) ___-____
COMMENTS: _____
STATUS: ___   ADJ DT: ____   ADJ ID: ____   APRV BY: ____   APRV DATE: ____

************THIS LINE WOULD BE FOR ERROR MESSAGES***************
PF1=HELP      PF3=PREV SCR    PF5=RSN CODE    PF7=UP         PF8=DOWN
PFX=PROC ADJ  PFY=APPROVE     PFZ=DELETE      PFQ=REVERSE    PF12=MAIN MENU
```

Fig. 4H

```
44444444              CREDIT CARD ADJUSTMENTS SYSTEM ADJUSTMENTS
MM/DD/YY
HH:MM:SS
COUNTRY: US    RRDD: 0727   SHIPPER#: 09602T   COMPANY: XXXXXXXXXXXXXXXXXXXXX
SOURCE:  UIS   TRANSACTION DATE: MM/DD/YY   ORIGIN ZIP: 12345  DEST ZIP: 98765
ACTUAL WT: 001   BILLED WT: 030   O/S TYPE:         ZONE: 106
PDT: SPB   CONT: UIS   PKG DLV: 1DA   REF1:RMA # 123
REF2:123456789

REASON FOR ADJUSTMENT: 007   INCORRECT WEIGHT
                  PUB          INC       BILLED      ADJ         REMAINING
CHARGE DESC     CHARGE        CREDIT     CHARGE     AMOUNT        BALANCE
TRANS            13.90         0.00       13.90      7.00           6.90
EVS               2.40         0.00        2.40                     2.40
FSC               0.14         0.00        0.14       .07            .07
TOTAL            16.44         0.00       16.44      7.07           9.37

CONTACT NAME: JOE WALLWORK                  PH NUMBER: (201)828-1383
COMMENTS: PACKAGE SHOULD HAVE BEEN BILLED @ 15LBS
STATUS:       ADJ DT:           ADJ ID:            APRV BY:          APRV DATE:

************THIS LINE WOULD BE FOR ERROR MESSAGES*******************
PF1=HELP      PF3=PREV SCR     PF5=RSN CODE     PF7=UP         PF8=DOWN
PFX=PROC ADJ  PFY=APPROVE      PFZ=DELETE       PFQ=REVERSE    PF12=MAIN MENU
```

```
33333333              CREDIT CARD ADJUSTMENTS SYSTEM                    MM/DD/YY
                             ADJUSTMENTS                                HH:MM:SS
                   420
                   ⌒
TRACKING NUMBER: 1Z123456XX12345678 ⎯ 412

LAST                        CC    CARD    REASON
O  TRANS TYPE   AMOUNT   DATE      ADJ ID    STATUS           TYPE   END     CODE
   FRT          16.44   02/10/04
   FRT-CCA      -7.07   03/16/04   FAS1VXG   PEND              MC    1234    007
   ADC          10.00   02/12/04                               MC    1234
   PDS           1.46   02/12/04                               MC    1234
   SCC           5.00   02/12/04                               MC    1234

OPTION:    S=SELECT  I=INQUIRY  A=APPROVE  D=DELETE  R=REVERSE
PF1=HELP   PF3=PREV SCR   PF7=BACK   PF8=FRWD   PFV=APRV ID         PF12=MAIN MENU
```

Fig. 4J

| 33333333 | | CREDIT CARD ADJUSTMENTS SYSTEM | | | | MM/DD/YY |
| | | ADJUSTMENTS — 412 | | | | HH:MM:SS |

420

TRACKING NUMBER: 1Z123456XX12345678

| O | TRANS TYPE | AMOUNT | DATE | LAST ADJ ID | STATUS | CC TYPE | CARD END | REASON CODE |
|---|---|---|---|---|---|---|---|---|
|   | FRT | 16.44 | 02/10/04 | | | MC | 1234 | |
| S | FRT-CCA | -7.07 | 03/16/04 | FAS1VXG | PEND | MC | 1234 | 007 |
|   | ADC | 10.00 | 02/12/04 | | | MC | 1234 | |
|   | PDS | 1.46 | 02/12/04 | | | MC | 1234 | |
|   | SCC | 5.00 | 02/12/04 | | | MC | 1234 | |

OPTION: ___  S=SELECT  I=INQUIRY  A=APPROVE  D=DELETE  R=REVERSE
PF1=HELP  PF3=PREV SCR  PF7=BACK  PF8=FRWD  PFV=APRV ID  PF12=MAIN MENU

| 55555555 | | CREDIT CARD ADJUSTMENTS SYSTEM<br>EXISTING ADJUSTMENTS | | | | | MM/DD/YY<br>HH:HH:SS |
|---|---|---|---|---|---|---|---|
| PR RRDD: ____ STATUS: _ (P/A/D) $Limit: ____ ($/A) ADJ ID: ____ |||||||
| TRACKING NUMBER: ____ DATES: __/__/__ TO __/__/__ |||||||
| O | TRACKING # | TRANS DATE | ADJ AMOUNT | CURR STAT | ADJ DATE | PROC RRDD | LAST ADJ ID | REASON CODE |
| | _____ | ____ | ____ | __ | ____ | ____ | ____ | ____ |
| | _____ | ____ | ____ | __ | ____ | ____ | ____ | ____ |
| | _____ | ____ | ____ | __ | ____ | ____ | ____ | ____ |
| | _____ | ____ | ____ | __ | ____ | ____ | ____ | ____ |
| | _____ | ____ | ____ | __ | ____ | ____ | ____ | ____ |
| | _____ | ____ | ____ | __ | ____ | ____ | ____ | ____ |
| | _____ | ____ | ____ | __ | ____ | ____ | ____ | ____ |
| | _____ | ____ | ____ | __ | ____ | ____ | ____ | ____ |
| | _____ | ____ | ____ | __ | ____ | ____ | ____ | ____ |

PAGE: ___ OF ___

PF3=PRV SCR   PF7=UP   PF8=DOWN   PF12=MAIN   ENTER=CONTINUE
O=I/D/M/A/R

```
55555555              CREDIT CARD ADJUSTMENTS SYSTEM                    MM/DD/YY
                          EXISTING ADJUSTMENTS                          HH:HH:SS

PR RRDD: 2010   STATUS: P (P/A/D)    $Limit: $ ($/A)   ADJ ID: __
TRACKING NUMBER:                     DATES: __/__/__ TO __/__/__

⎯440

ADJ                    ADJ     CURR   PROC  LAST            REASON
O TRACKING #  DATE     AMOUNT           DATE     STAT   RRDD  ADJ ID          CODE
  1Z123456ZZ12345678  02/10/04    7.07  03/16/04 PEND   2010  FAS1VXG         007
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___
  _____  _____  _____  _____ ____   ____  _____         ___

PAGE: 001 OF 001

PF3=PRV SCR  PF7=UP  PF8=DOWN  PF12=MAIN  ENTER=CONTINUE
O=I/D/M/A/R
```

Fig. 8C

```
55555555              CREDIT CARD ADJUSTMENTS SYSTEM                    MM/DD/YY
                          EXISTING ADJUSTMENTS                          HH:HH:SS

PR RRDD: 2010   STATUS: A (P/A/D)    $Limit: $ ($/A)    ADJ ID: ___
TRACKING NUMBER: _____             DATES: __/__/__ TO __/__/__
                                                                            440
                       ADJ     CURR    ADJ       PROC  LAST         REASON
O TRACKING #      DATE AMOUNT  STAT    DATE      RRDD  ADJ ID       CODE
  1Z123456ZZ12345678 02/10/04  7.07 APPR  03/16/04  2010  FAS1VXG   007
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___
  _____ _____ _____ ____ _____ ____ _____ ___

PAGE: 001 OF 001

PF3=PRV SCR   PF7=UP   PF8=DOWN   PF12=MAIN   ENTER=CONTINUE
O=I/D/M/A/R
```

Fig. 8D

```
44444444          CREDIT CARD ADJUSTMENTS SYSTEM ADJUSTMENTS                MM/DD/YY
                                                                            HH:MM:SS
COUNTRY: US   RRDD: 0727  SHIPPER#: 09602T  COMPANY: XXXXXXXXXXXXXXXXXXXXXX
SOURCE: UIS   TRANSACTION DATE: MM/DD/YY   ORIGIN ZIP: 12345  DEST ZIP: 98765
ACTUAL WT: 001  BILLED WT: 030  O/S TYPE: 1DA   ZONE: 106
PDT: SPB  CONT:  PKG  DLV:  1DA   REF1:RMA # 123        REF2: 123456789

REASON FOR ADJUSTMENT: 007  INCORRECT WEIGHT
                    PUB       INC        BILLED       ADJ       REMAINING
CHARGE DESC        CHARGE    CREDIT      CHARGE      AMOUNT     BALANCE
TRANS              13.90      0.00        13.90       7.00        6.90
EVS                 2.40      0.00         2.40                   2.40
FSC                 0.14      0.00         0.14        .07         .07
TOTAL              16.44      0.00        16.44       7.07        9.37

CONTACT NAME: JOE WALLWORK          PH NUMBER: (201)828-1383
COMMENTS: PACKAGE SHOULD HAVE BEEN BILLED @ 15LBS
STATUS:APPR ADJ DT:03/16/04  ADJ ID:FAS1VXG APRV BY:FAS1JXW APRV DATE:03/17/04
*************THIS LINE WOULD BE FOR ERROR MESSAGES*****************
PF1=HELP      PF3=PREV SCR     PF5=RSN CODE    PF7=UP         PF8=DOWN
PFX=PROC ADJ  PFY=APPROVE      PFZ=DELETE      PFQ=REVERSE    PF12=MAIN MENU
```

```
33333333              CREDIT CARD ADJUSTMENTS SYSTEM                    MM/DD/YY
                              ADJUSTMENTS                               HH:MM:SS
                                         420
TRACKING NUMBER: 1Z123456XX12345678 ─── 412

LAST                   CC   CARD   REASON
O  TRANS TYPE  AMOUNT    DATE       ADJ ID    STATUS       TYPE  END    CODE
   FRT          16.44   02/10/04
   FRT-CCA      -7.07   03/16/04   FAS1VXG    APPR  ⇐       MC   1234   007
   ADC          10.00   02/12/04                            MC   1234
   PDS           1.46   02/12/04                            MC   1234
   SCC           5.00   02/12/04                            MC   1234

⇒

OPTION:   S=SELECT   I=INQUIRY   A=APPROVE   D=DELETE   R=REVERSE
PF1=HELP  PF3=PREV SCR  PF7=BACK  PF8=FRWD  PFV=APRV ID          PF12=MAIN MENU
```

Fig. 8F

| 33333333 | | CREDIT CARD ADJUSTMENTS SYSTEM | | | | MM/DD/YY |
|---|---|---|---|---|---|---|
| | | ADJUSTMENTS | | | | HH:MM:SS |

TRACKING NUMBER: 1Z123456XX12345678 — 412

| | TRANS TYPE | AMOUNT | DATE | APRV ID | STATUS | CC TYPE | CARD END | CARD REASON CODE |
|---|---|---|---|---|---|---|---|---|
| O | FRT | 16.44 | 02/10/04 | | | MC | 1234 | |
| | FRT-CCA | -7.07 | 03/16/04 | FAS1JXW | APPR | MC | 1234 | 007 |
| | ADC | 10.00 | 02/12/04 | | | MC | 1234 | |
| | PDS | 1.46 | 02/12/04 | | | MC | 1234 | |
| | SCC | 5.00 | 02/12/04 | | | MC | 1234 | |

OPTION:   S=SELECT    I=INQUIRY    A=APPROVE    D=DELETE    R=REVERSE
PF1=HELP   PF3=PREV SCR   PF7=BACK   PF8=FRWD   PFV=LAST ADJ ID     PF12=MAIN MENU

FLEXIBLE BILLING ADJUSTMENT SYSTEM

FIELD OF THE INVENTION

The present invention relates generally to billing systems, and, more particularly, to flexible billing systems that can be used within the transportation industry, and other such industries, to more easily and efficiently facilitate adjustments to transactions that have been applied to credit cards and other such payment cards.

BACKGROUND OF THE INVENTION

With the advent of the Internet and other related factors, credit cards have become an increasingly popular means by which to pay for shipping charges. For some transportation companies, such as the United Parcel Service (UPS), this has lead to a substantial increase in the number of monthly billing inquiries that relate to credit card charges. Consider the situation in which a customer discovers a shipping charge on their credit card bill for what they believe is an incorrect amount, either in whole or in part. When this happens, the customer typically contacts the transportation company via phone or e-mail to request that an appropriate refund be applied to their credit card. However, many "in-house" billing systems in the transportation industry, and other such industries, were traditionally not designed to easily and efficiently accommodate such requests. As a result, the carrier would sometimes have to inform the customer that they do not have a way to apply the appropriate credit to the customer's credit card.

In some cases, the carrier might instead suggest that the customer contact their credit card company directly to obtain a refund. Unfortunately, this more often than not resulted in still further inconvenience for the customer, as credit card companies often require such requests to be submitted in writing. If the customer's request is eventually approved by the credit card company, the customer's account is credited and the carrier receives a corresponding "chargeback" for the amount in question. Furthermore, the credit card company, for having to process the request, typically assesses the carrier an additional "chargeback fee" of approximately five or ten dollars, which in many cases is more than the original shipping charge. And once received, the carrier still has to spend the time and money to go off and manually research the validity of the chargeback before honoring it.

To avoid customer dissatisfaction with the above process, transportation companies, and other such companies, sometimes choose to handle such requests. One available option is to provide customers with refund checks instead of applying a credit directly to the customer's credit card. However, the prospect of having to process, generate and mail individual refund checks for what is a growing number of such requests can be cost prohibitive. Alternatively, or additionally, some companies maintain a special customer service division that is solely responsible for manually investigating and processing such requests. Unfortunately, this too has proved exceedingly costly and inefficient in some cases.

Therefore, an unsatisfied need exists in the industry for improved systems and methods for facilitating adjustments to transactions that have been applied to a credit card, or other such payment cards, that overcome the deficiencies in the prior art, some of which are discussed above.

BRIEF SUMMARY OF THE INVENTION

Embodiments implemented according to the present invention provide systems and methods for facilitating adjustments to billing transactions that have been applied to a credit card, or other such payment cards, that overcome the deficiencies in the prior art, some of which are discussed above. Such systems may, for example, be particularly advantageous in the context of billing transactions that occur within the transportation industry.

In one exemplary embodiment, a system for processing a billing adjustment request related to one or more past shipping charges that were applied to a credit card used by a customer of a carrier is disclosed that includes: a database for storing information related to past shipping charges; a display device for displaying billing related information to a user via a graphical user interface; an input device for allowing the user to input information via the graphical user interface; and one or more computers in communication with the input device, the display device, and the database. Furthermore, the one or more computers are configured for: allowing the user to enter a reference number that references at least one shipment associated with the customer; retrieving from the database a list of one or more past credit card transactions that are associated with the reference number; allowing the user to select a transaction from the list of one or more past credit card transactions; submitting a billing adjustment request in association with the selected transaction, wherein the billing adjustment request comprises applying an adjustment amount to a past transaction amount of the selected transaction, the past transaction amount having been previously applied to the credit card; and transmitting the adjustment amount in association with the credit card number of the credit card to a credit card company that is responsible for handling charges applied to the credit card.

In another embodiment, a method of processing a billing adjustment request related to one or more past shipping charges that were applied to a credit card used by a customer of a carrier is disclosed that includes the steps of: allowing a user to enter a reference number that references at least one shipment associated with the customer; retrieving from a database a list of one or more past credit card transactions that are associated with the reference number; allowing the user to select a transaction from the list of one or more past credit card transactions; submitting a billing adjustment request in association with the selected transaction, wherein the billing adjustment request comprises applying an adjustment amount to a past transaction amount of the selected transaction, the past transaction amount having been previously applied to the credit card; and transmitting the adjustment amount in association with the credit card number of the credit card to a credit card company that is responsible for handling charges applied to the credit card.

In yet another embodiment, a method of processing a billing adjustment request related to one or more past shipping charges that were applied to a credit card used by a customer of a carrier is described that includes the steps of: allowing a user to enter a tracking number that identifies a particular shipment associated with the customer; retrieving from a database a list of one or more past credit card transactions that are associated with the tracking number; allowing the user to select a transaction from the list of one or more past credit card transactions; allowing the user to enter a reason input that identifies a reason for performing a billing adjustment request to the selected transaction, wherein the billing adjustment request comprises applying an adjustment amount to a past transaction amount of the selected transaction, the past transaction amount having been previously applied to the credit card; allowing the user to enter the adjustment amount by which the transaction amount of the selected transaction is to be reduced, the transaction amount comprising one or more itemized shipping charges that are associated with the selected transaction, and the adjustment amount comprising one or more individual offset amounts that are applied, respectively, to the one or more itemized shipping charges; submitting the billing adjustment request in association with the selected transaction to an adjustment transaction database for awaiting approval by an authorized person; and subsequent to the billing adjustment request being approved, transmitting the adjustment amount in association with the credit card number of the credit card to a credit card company that is responsible for handling charges applied to the credit card.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4A-4J are graphic illustrations of billing adjustment windows that are used to create a new credit card billing adjustment request in accordance with an embodiment of the present invention.

FIGS. 6A-6B are graphic illustrations of billing adjustment windows that are used to update an existing credit card billing adjustment request in accordance with an embodiment of the present invention.

FIGS. 8A-8G are graphic illustrations of billing adjustment windows that are used to approve or delete an existing credit card billing adjustment request in accordance with an embodiment of the present invention.

DETAILED DESCRIPTION OF THE INVENTION

Figure 1:
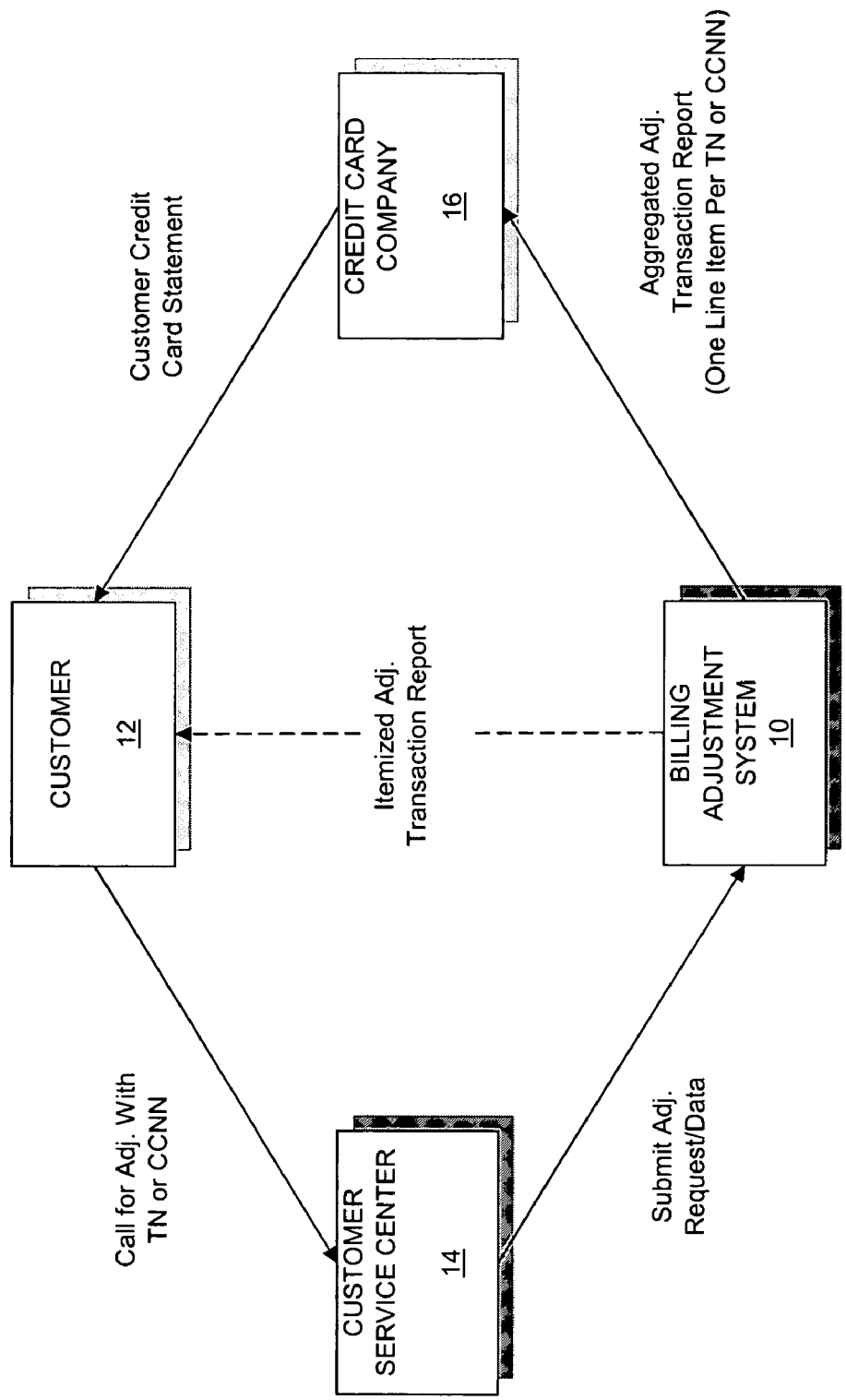
FIG. 1 shows a high level block diagram depicting events that occur over the course of a credit card billing adjustment request in accordance with an embodiment of the present invention.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the system or flowchart blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

Overview

The present invention relates to flexible billing systems that can be used within the transportation industry to facilitate credit card billing adjustments to credit cards that were previously used by customers to pay for one or more shipping charges. In particular, the present invention provides a system or tool that enables a user to easily access a detailed billing history of credit card transactions in order to apply full or partial credit card billing adjustments that specifically correspond to individual transactions included in the history of charges associated with a particular item or shipment.

FIG. 1 shows a high-level block diagram depicting events that occur over the course of a credit card billing adjustment transaction in accordance with an embodiment of the present invention. Credit cards, and other such payment cards, have become an increasingly popular means by which to pay for shipping charges. This, in turn, has lead to a considerable increase in the number of billing inquiries that some transportation companies receive each month relating to credit card charges. To address this growing demand in the industry, the present invention provides a unique credit card billing adjustment system 10. In a typical credit card billing adjustment scenario, a customer 12 contacts a transportation company's customer service center 14 subsequent to discovering what they believe is an incorrect shipping charge on a statement received from their credit card company 16. The billing adjustment system 10 allows a customer service representative (or user) at the center 14 to easily and efficiently process such requests without burdening the customer with the need to first contact one or more "third parties" such as the credit card company 16.

The system 10 allows a user working at the customer service center 14 to initiate an adjustment request by entering a reference number that is used for referencing one or more past shipments associated with the customer 12. In one embodiment, the reference number can be either a tracking number (TN) or a credit card notification number (CCNN). As used herein, the term "tracking number" (TN) refers to any type of identification number that would typically be used in the transportation industry (or other such industry) to identify and/or track a particular item or shipment. The term "credit card notification number" (CCNN), as used herein, refers to any type of credit card transaction identifier that is used to reference one or more shipping charges made to a particular credit card over a given period of time, such as all charges made to a given credit card during a particular week. As such, a CCNN can have associated with it a number of credit card charges that relate to a plurality of different tracking numbers. In one embodiment, a CCNN is a carrier generated transaction identifier that consists of the credit card number, date and currency code, which can be used by personnel at the customer service center 14 to reference all charges applied to that credit card during a particular time period, such as for a particular week.

As will be described in further detail below, if the user enters a CCNN to initiate the search for associated transactions, the billing adjustment system 10 retrieves all TNs associated with that CCNN from a billing transaction database 21. Alternatively, if the user enters a TN to initiate the search for associated transactions, or if the user selects a TN from among those associated with a CCNN, the system 10 will retrieve all transactions associated with that TN from the billing transaction database 21. As will be shown, the system 10 is configured to display line items for all transactions retrieved from the billing transaction database 21 (as well as for all pending adjustment transactions retrieved from a adjustment transaction database 23). The system 10 is further configured to provide the user with a number of interactive billing adjustment screens that allow the user to explain, and if appropriate, adjust in whole or in part each individual transaction charge associated with the selected TN. In one embodiment, each adjustment request that is submitted by a user is subject to an approval process that is restricted to authorized agents. The approval process includes the ability to set an automatic approval threshold amount for each country. This amount is typically in the currency of the country where the adjustment is being processed.

According to one embodiment, the system 10 aggregates all approved adjustment transactions having the same TN and transaction date, and charged to the same credit card number, as one invoice item. Similarly, the system 10 also aggregates all approved adjustment transactions having the same CCNN and transaction date, and charged to the same credit card number, as one invoice item. When an adjustment transaction is associated with both a TN and a CCNN, the CCNN will take precedence for aggregation process. Each aggregated invoice item to be applied to a particular credit card number is then passed, electronically via a computer network or otherwise, to the credit card company 16. Each aggregated invoice item ultimately appears as a line item on the credit card statement of the customer 12, preferably with the related TN or CCNN shown on the statement. As illustrated in FIG. 1, the system 10, in one embodiment, can also be configured to provide each customer 12 with an itemized adjustment transaction report that provides additional detail behind each of the line items appearing on the customer's normal credit card statement received from the credit card company 16. This can be provided, for example, in the form of a weekly or monthly e-mail sent directly to the customer.

System Architecture

Figure 2:
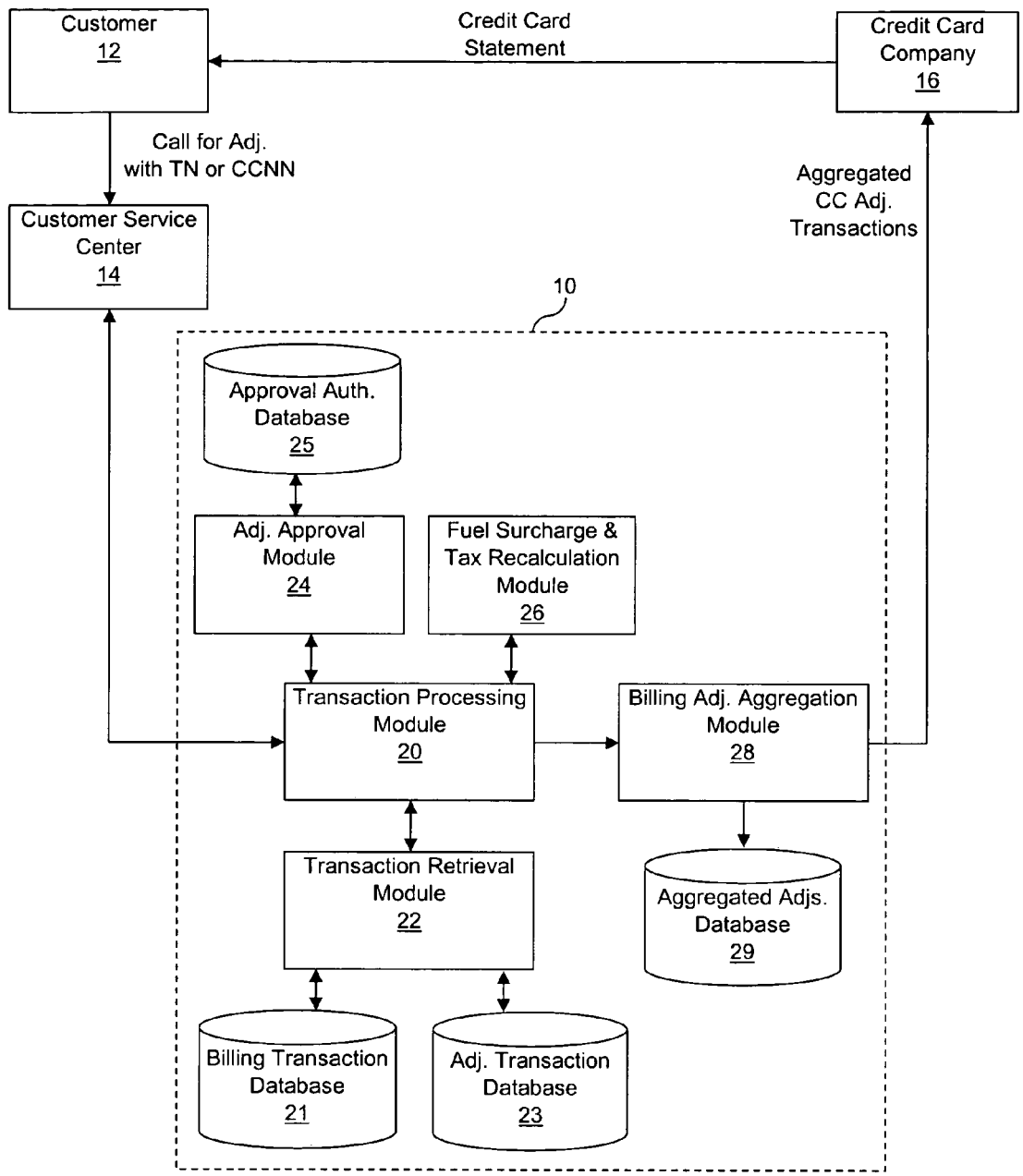
FIG. 2 shows a block diagram of the credit card billing adjustment system of FIG. 1 in accordance with an embodiment of the present invention.

FIG. 2 shows a high-level block diagram of the credit card billing adjustment system 10 of FIG. 1 in accordance with one embodiment of the present invention. The system 10 includes a transaction processing module 20, a transaction retrieval module 22, an adjustment approval module 24, a fuel surcharge and tax recalculation module 26, and a billing adjustment aggregation module 28. The system 10 further includes a billing transaction database 21, an adjustment transaction database 23, an approval authorization database 25, and an aggregated adjustments database 29. In one embodiment, the processing modules (or applications) and related databases can reside on a server, which is accessible via a computer network by client computers being operated by users at the customer service center 14. One of ordinary skill in the art will readily recognize that one or more of these modules and/or databases can reside on separate servers or other computer systems. Furthermore, one or more of the modules and/or databases can be combined or divided into separate applications and/or files by function or by other means known in the art. The functionality provided by these various components will now be described.

In one embodiment, the transaction processing module 20 can be configured to receive as input either a tracking number (TN) or a credit card notification number (CCNN). Thus, in a typical situation, a customer service representative (or user) at the customer service center 14 might begin the process of performing a credit card billing adjustment request by entering either a tracking number (TN) or a credit card notification number (CCNN). The particular user-entered TN or CCNN might, for example, be one that has been provided to the user by a customer 12 who is calling to inquire about an invalid charge on their credit card statement. As indicated above, the term "tracking number" (or TN) refers to any type of identification number that would typically be used in the transportation industry (or any other such industry) to identify and/or track a particular item or shipment, and the term "credit card notification number" (or CCNN) refers to any type of credit card transaction identifier that is used to reference one or more shipping charges made to a given credit card over a particular period of time.

If the user initiates the adjustment process by entering a TN, the transaction processing module 20 can be configured to call the transaction retrieval module 22 to retrieve all past transactions associated with the user-entered TN. Transactions associated with the user-entered TN may include both original billing transactions, which are stored in the billing transaction database 21, and adjustment transactions, which are stored in the adjustment transaction database 23. If the user initiates the adjustment process by entering a CCNN (instead of a TN), the transaction retrieval module 22 can be configured to first retrieve a list of all TNs associated with the user-entered CCNN. The user may then select a particular TN from the list, in response to which, the transaction processing module 20 can again be configured to call the transaction retrieval module 22 to retrieve all past transactions that are associated with the particular TN.

In one embodiment, package level detail (PLD) data for all original transactions billed to a credit card can be maintained in the billing transaction database 21 for at least thirteen weeks, and similarly, any subsequent adjustments made to such transactions will be stored in the adjustment transaction database 23. Transactions stored in the adjustment transaction database 23 may include, for example: 'pending adjustments,' which have been submitted to the system 10 but not yet approved; 'approved adjustments,' which have been submitted and approved, but not yet billed out to the credit card company 16; and 'billed adjustments,' which have been submitted, approved and billed out to the credit card company. Queries of the billing transaction database 21 and/or the adjustment transaction database 23 can be carried out by the transaction retrieval module 22 using a variety of search criteria including, but not limited to, TN, region/district code, status, user ID, authorization dollar amount and date range. In addition to these and other applicable search criteria, a query of the adjustment transaction database 23 by the transaction retrieval module 22 can also be based at least in part on a CCNN, which is used to identify one or more past adjustment transactions. After all related transactions have been retrieved and presented to the user via one or more adjustment screens, the user can select a particular transaction for which an adjustment is to be performed.

In one embodiment, all adjustment transactions created in the system 10 are required to include a reason code that justifies issuing a credit to the customer 12. Preferably, only one reason code per adjustment transaction will be valid. Based on the reason provided by the user, the system may determine whether a "system-populated, full" adjustment or a "user populated" adjustment is to be performed. In the case of a "system-populated, full" adjustment, the system can be configured to automatically populate full adjustment amounts for all charges retrieved in association with the original transaction. Preferably, the user does not have the ability to override the full amounts that have been populated by the system in the appropriate adjustment fields. By way of example only, in one embodiment, the following reasons for an adjustment would result in the generation of a system-populated, full adjustment: "shipper billed in error"; "credit card billed in error"; "billed for voided package"; "duplicate billing"; "customer paid cash at time of pickup"; "service upgrade/re-ship at no charge"; and "customer paid by check."

According to another aspect of the present invention, a user of the system 10 can also rebill the full transaction amount of a past transaction to an alternate payment source. In one embodiment, the full transaction amount of a past transaction, which was previously applied to a first credit card, can be rebilled or reapplied to either a second credit card (e.g., one that is more preferable to the customer), or to a customer account number that the customer, for example, maintains with the carrier. In this case, the transaction amount of the selected transaction can be refunded (or credited in full) to the credit card to which the transaction amount was previously applied, and the transaction amount can then be rebilled to a new payment source, which is identified to the system 10 by the user. To avoid over-crediting a given account, the system 10 can also be configured to determine whether there currently exists any pending adjustment requests that are associated with the selected transaction. If any such pending adjustment requests are found, the system can be configured to disallow the current request.

If the reason for the adjustment provided by the user indicates to the system 10 that a "user populated" adjustment is to be performed, the system generates unpopulated adjustment-amount entry fields for each charge retrieved in association with the original transaction. In this case, as will be illustrated below, the user is able to calculate the appropriate refund and enter the adjustment amounts in the corresponding line items provided for the charges retrieved in association with the original transaction. In one embodiment, the system 10 can be configured to ensure that the total of the new adjustment amounts does not exceed the charges for the original billed transaction. In other words, the user is preferably not permitted to adjust a past credit card transaction in an amount greater than the total original charge minus any previous and pending adjustments. Thus, if the user selects a transaction for which an adjustment has already been approved, or for which an adjustment is pending, a new adjustment can still be entered for the transaction but will be limited to the remaining billed amount (i.e., Additional Adjustment<=Original Charge−Previous Adjustment(s)−Pending Adjustment(s)).

As noted above, the billing adjustment system 10 depicted in FIG. 2 further includes an adjustment approval module 24, a fuel surcharge and tax recalculation module 26, and a billing adjustment aggregation module 28. In the course of processing a given adjustment request, the transaction processing module 20 may call the fuel surcharge and tax recalculation module 26 to compute any applicable changes in taxes and/or surcharges (if any) that are a result of the adjustment. This may include, for example, recalculating any taxes and/or fuel surcharges associated with a past transaction when the adjustment amount entered by the user is different from the original billed amount.

The adjustment approval module 24 is configured to handle functionality associated with the credit card adjustment approval process. In one embodiment, the ability to approve, delete, modify or reverse pending adjustments is restricted to authorized agents. In particular, the approval process allows for the assignment of authorization thresholds by security level, which can include, for example, the following levels: administrative—no approval rights; supervisor—limited approval rights; and manager—unlimited approval rights. The authorization threshold assigned to each user of the system 10, along with other related information, can be stored in the approval authorization database 25. The approval process can further include the ability to set an automatic approval threshold amount for each country. This amount will typically be in the currency of the country where the adjustment is being processed. Pending adjustments can be retrieved for approval from the adjustment transaction database 23 based on one or more search criteria including, but not limited to, TN, CCNN, region/district code, status, user ID, authorization dollar amount and date range.

The billing adjustment aggregation module 28 is responsible for aggregating all credit card adjustments so that they can be sent in an appropriate format to the credit card company 16. In one embodiment, the billing adjustment aggregation module 28 is configured to aggregate all approved adjustment transactions having the same TN and transaction date, and charged to the same credit card number, as one invoice item to be sent to the credit card company 16. The billing adjustment aggregation module 28 can also be configured to aggregate as one invoice item, all approved adjustment transactions having the same CCNN and transaction date, and charged to the same credit card number. In one embodiment, when an adjustment transaction is associated with both a TN and a CCNN, the CCNN will take precedence for the aggregation process. A record of each aggregated invoice item, including the details of the one or more adjustment transactions associated with each such aggregated invoice item, can be stored in the aggregated adjustments database 29. According to one embodiment, on a daily basis each aggregated invoice item can be submitted (electronically via a computer network, or otherwise) to the appropriate credit card company 16. The TN (or CCNN) along with the total daily dollar amount of the aggregated adjustments will then appear on the customer's next credit card statement as a single line item.

Creating a New Adjustment

The following paragraphs describe the process of creating a new credit card billing adjustment request using the billing adjustment system 10. In particular, reference is now made to FIGS. 3A-3B, which show a process flow diagram that illustrates the steps by which a user generates a new credit card billing adjustment request, and to FIGS. 4A-4J, which provide graphic illustrations of billing adjustment windows that can be used to carry out such process in accordance with a preferred embodiment of the present invention.

Figure 3A:
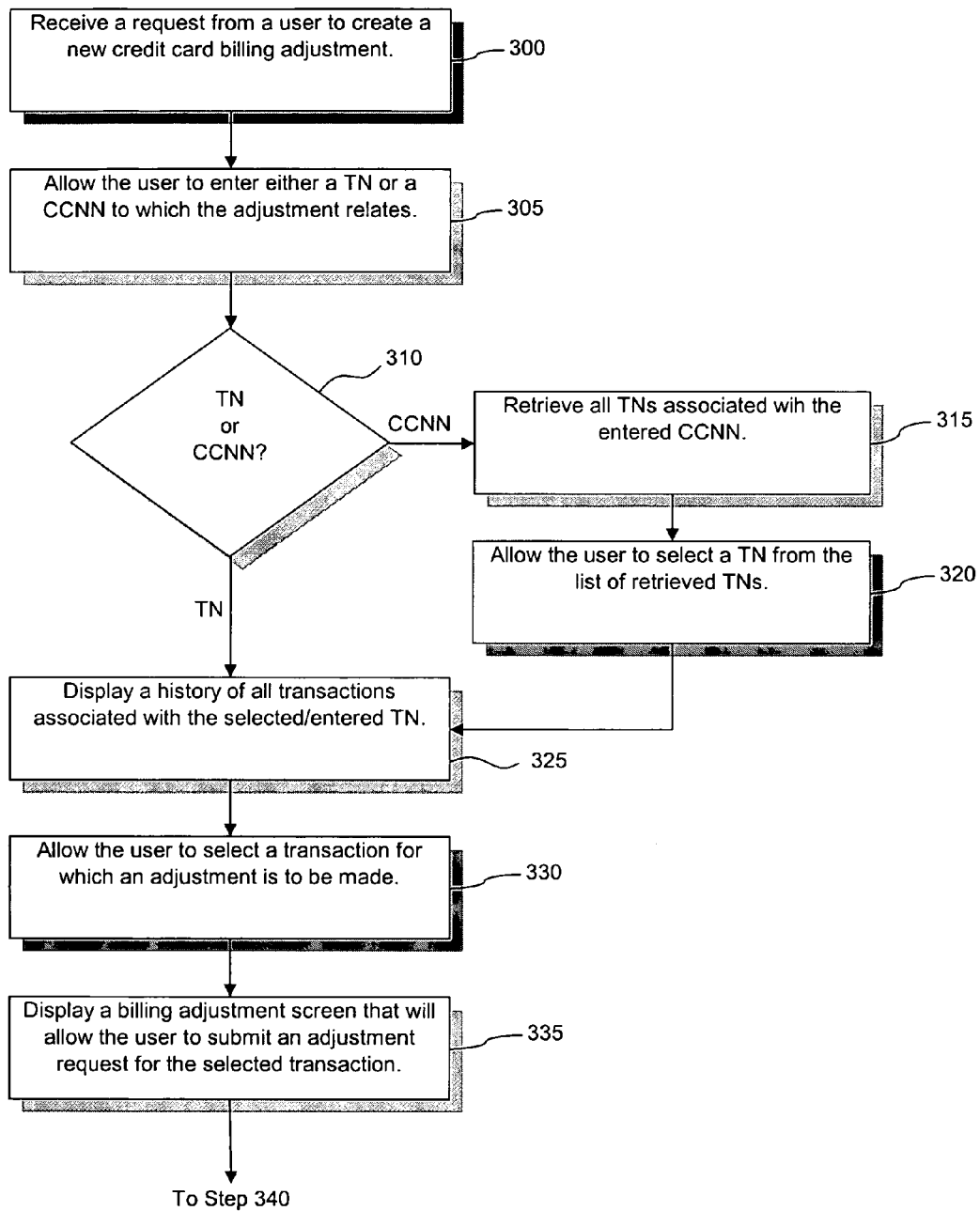
FIGS. 3A-3B show a process flow diagram that illustrates the steps by which a user creates a new credit card billing adjustment request in accordance with an embodiment of the present invention.
Figure 3B:
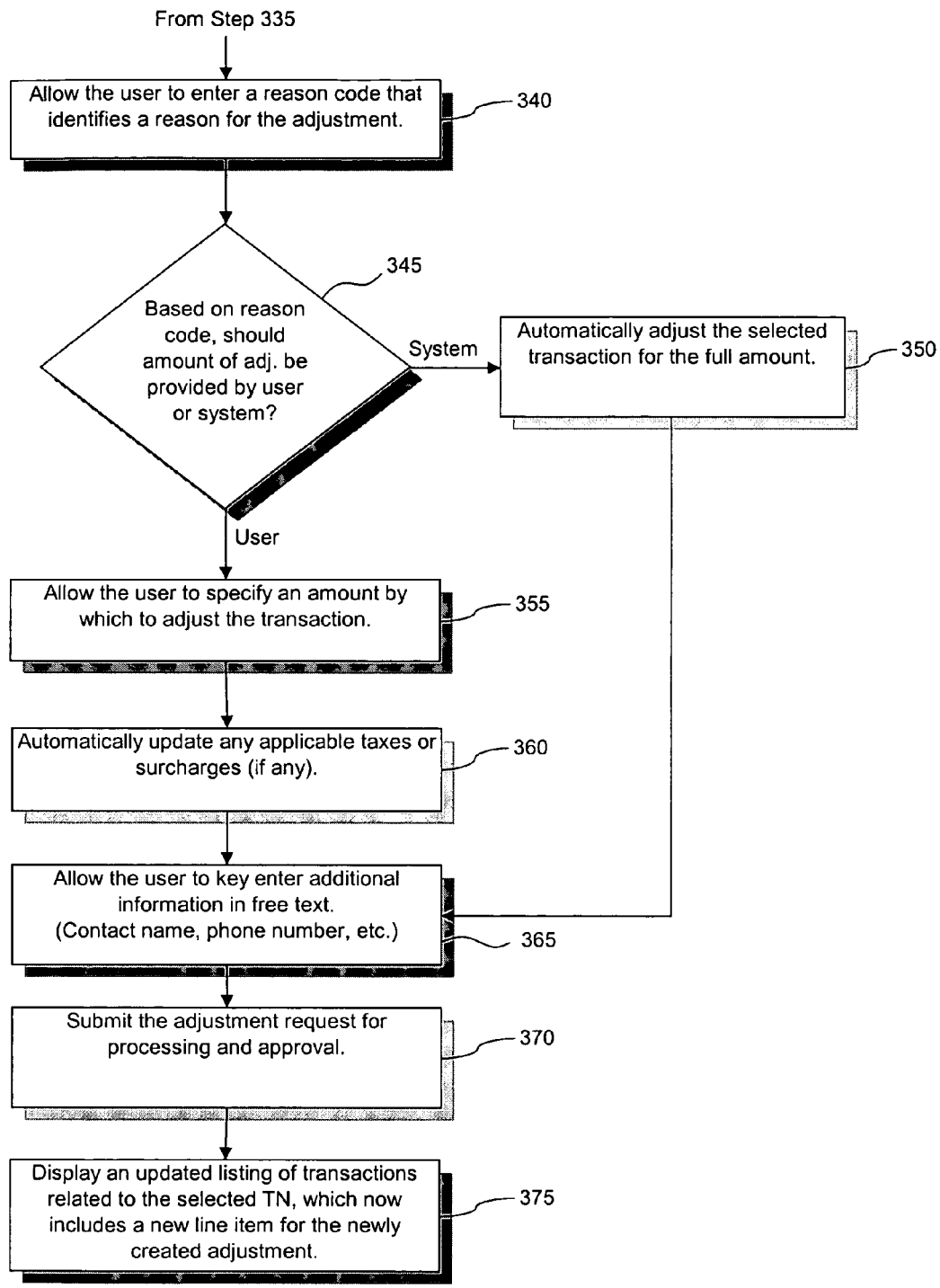
Figure 4A:
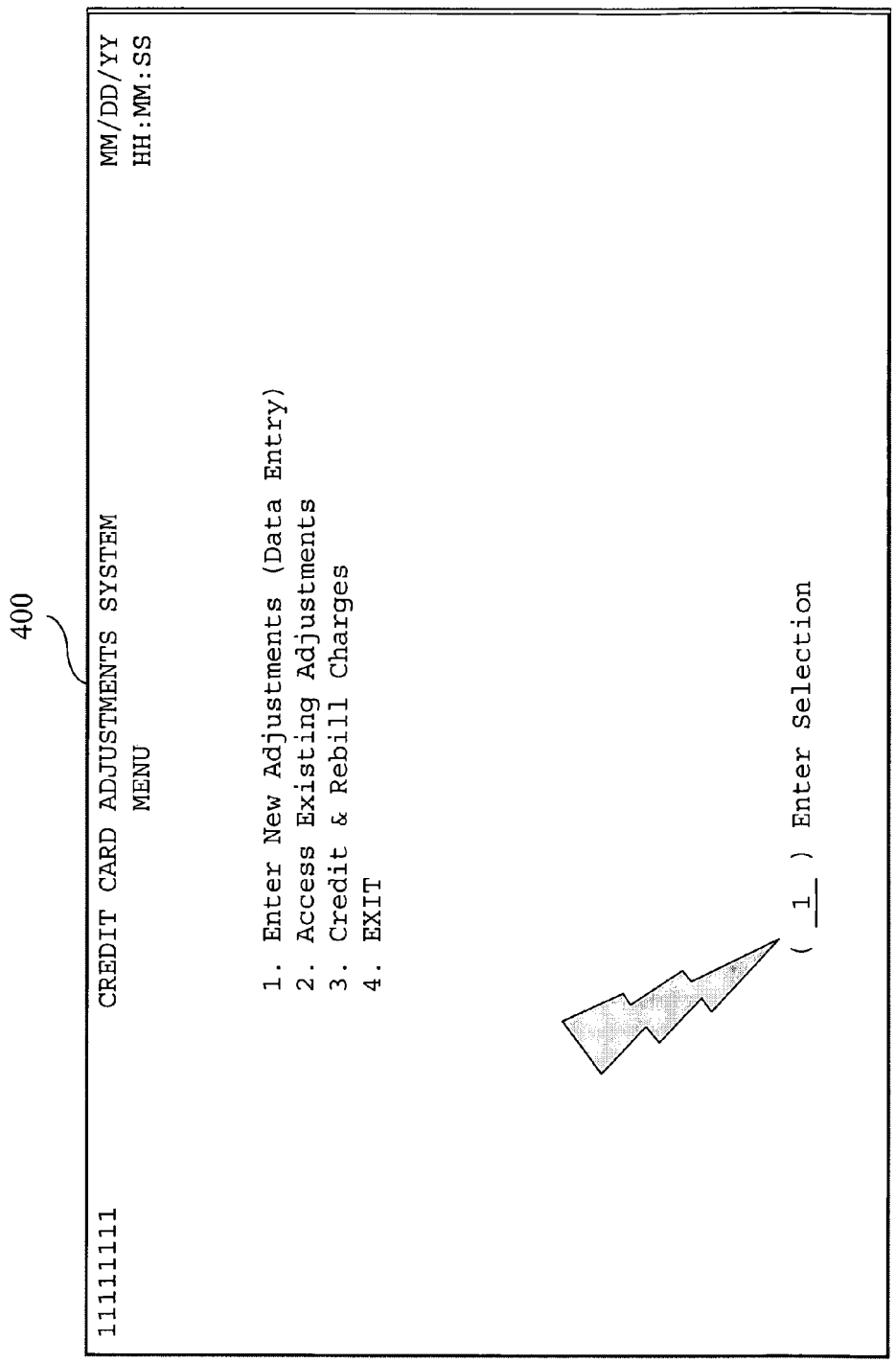

As shown in FIG. 3A, when executing the billing adjustment system 10, at Step 300, the system first receives a request from a user to initiate a new adjustment to a past credit card transaction. In a preferred embodiment of the invention, the system 10 displays a menu window 400 such as the menu window shown in FIG. 4A. As may be understood from this figure, such a window includes an option to enter or create a new adjustment, which in this case is option "1." After completing Step 300 by entering "1" and pressing enter, the system proceeds to Step 305 where it allows the user to enter either a tracking number (TN) or a credit card notification number (CCNN). In the preferred embodiment of the invention, the system accomplishes this by providing the user with a tracking/notification entry screen 410 such as the tracking/notification entry screen shown in FIG. 4B. As shown, the tracking/notification entry screen 410 includes respective input fields that allow the user to access past billing information associated with either a TN 412 or a CCNN 414.

If the system, at Step 310, determines that the user has entered a CCNN 414, the system proceeds to Step 315 where it retrieves all TNs 412 that are associated with the user-entered CCNN 414. An example of this is provided in FIG. 4C where, in response to the user having entered a particular CCNN 414, the system has retrieved all associated TNs 412. At this point, the system, at Step 320, allows the user to select a TN 412 from the list of TNs that have been retrieved. As depicted in FIG. 4C, the user can select a particular TN 412 by placing an "S" in the "OPT" (or option) column next to the tracking number for which the user would like to perform an adjustment. In response to selecting a particular TN 412, the system, at Step 325, displays a history of all transactions associated with the selected TN. In one embodiment, the system executes Step 325 by displaying a transaction summary window 420 such as the transaction summary window shown in FIG. 4D.

Returning to Step 310, if the user enters a TN 412 instead of a CCNN 414, the system proceeds directly to Step 325 where it again displays a transaction summary window 420, such as the transaction summary window depicted in FIG. 4D. If the user discovers they have entered an incorrect TN 412, the user can retype the tracking number at the top of window 420 and press enter to bring up the new tracking number along with any related billing information.

As may be understood from FIG. 4D, the transaction summary window 420 provides a list of all billing transactions that are associated with the user-entered (or selected) TN 412. As shown, a transaction type (TRANS TYPE) is provided for each transaction listed. In one embodiment, the different transaction types listed in association with a given TN 412 may include Freight (FRT), Address Corrections (ADC), Post Delivery Surcharge (PDS) and Shipping Charge Corrections (SCC), to name just a few. Other transaction-related fields include the amount (AMOUNT) and date (TRANS DT) of each transaction, and the type (CC TYPE) and number (CARD ENDING) of the credit card that was used to pay for the charges. In one embodiment, to provide added security against fraud, the user sees only the last four digits of the credit card number that was used to pay for each transaction. This enables the user to confirm with the customer 12 that the correct transactions have been retrieved without requiring the customer to provide confidential credit card information to the user over the phone. The remaining fields shown in the transaction summary window 420—"LAST ADJ ID," "STATUS" and "REASON CODE"—relate to existing credit card adjustment transactions and are described in detail below.

After executing Step 325, the system proceeds to Step 330 where it allows the user to select a transaction for which an adjustment is to be made. In one embodiment, the user can select a transaction by entering an "S" in the option column next to the transaction that is to be selected. Doing so allows the user to create an adjustment to the selected transaction (or edit an existing adjustment that was previously submitted). In response to the user's selection in Step 330, the system, at Step 335, displays a transaction adjustment window 430 such as the transaction adjustment window shown in FIG. 4E. In this example, the user has selected the "Freight" transaction (FRT) of FIG. 4D. As can be seen in the top portion of FIG. 4E, the transaction adjustment window 430 is pre-populated with a variety of header information, such as shipper number, company name, transaction date, origin zip code, destination zip code, actual weight of shipment, billed weight of shipment and transaction date, to name just a few. The system 10 also pre-populates the transaction adjustment window 430 with a list of all applicable charges that are associated with the selected transaction (e.g., all charges associated with the "FRT" transaction).

As may be understood from FIG. 4E, the adjustment amount field (ADJ AMOUNT) associated with each transaction charge is blank when the user first enters the transaction adjustment window 430. In one embodiment, to continue with the creation of a new adjustment, the user, at Step 340, needs to input a reason code that identifies a reason for the adjustment before they can enter an amount by which to adjust the related charges. More particularly, in the embodiment shown, the user would type in a three-digit reason code next to the "REASON FOR ADJUSTMENT" field and press enter. The reason code text corresponding to the entered reason code would then appear in a manner as depicted in FIG. 4F (e.g., "007 INCORRECT WEIGHT"). If the user does not know the appropriate three digit reason code, they can bring up a list to select from by entering the reason code "PF5" listed in the bottom portion of the screen shown in FIG. 4F. In response to the user having entered a reason code at Step 340, the system, at Step 345, determines whether the reason code warrants a "system-populated, full" adjustment or a "user populated" adjustment. In other words, based on the reason code, the system determines whether the amount of the adjustment is to be provided by the user as input or by the system automatically.

In one embodiment, all adjustment transactions created using the system 10 are required to include a reason that justifies issuing a credit to the customer 12. Preferably, only one reason code per adjustment transaction will be valid. Based on the reason provided by the user, the system determines whether a "system-populated, full" adjustment or a "user populated" adjustment is to be performed. In the case of a "system-populated, full" adjustment, the system automatically populates full adjustment amounts for all charges retrieved in association with the original transaction. An example of this is provided below. Preferably, the user does not have the ability to override the (full) amounts that have been automatically populated by the system in the appropriate adjustment fields. By way of example only, the following reasons for an adjustment would, in one embodiment, result in the generation of a system-populated, full adjustment: "shipper billed in error"; "credit card billed in error"; "billed for voided package"; "duplicate billing"; "customer paid cash at time of pickup"; "service upgrade/re-ship at no charge"; and "customer paid by check."

On the other hand, if the user-entered reason code indicates to the system 10 that a "user populated" adjustment is to be performed, the system generates unpopulated adjustment-amount entry fields for each charge retrieved in association with the original transaction. An example of a "user populated" adjustment is provided in FIG. 4F. In this case, the user is able to calculate the appropriate refund and enter adjustment amounts in the corresponding line items provided for each of the charges retrieved in association with the original transaction (e.g., the original "FRT" transaction). In one embodiment, the system 10 is configured such that the total of the new adjustment amounts does not exceed the charges for the original billed transaction. In other words, the user is preferably not permitted to adjust a past credit card transaction in an amount greater than the total original charge minus any previous and pending adjustments. Thus, if the user selects a transaction for which an adjustment has already been approved, or for which an adjustment is pending, a new adjustment can still be entered but will be limited to the remaining billed amount (i.e., Additional Adjustment<=Original Charge−Previous Adjustment(s)−Pending Adjustment(s)).

Therefore, if, at Step 345, the system determines that the reason for the adjustment corresponds to a "user populated" adjustment, the process advances to Step 355, where the system allows the user to input an amount by which to adjust the selected transaction. An example of this is provided in FIG. 4G, where, in response to the user having indicated to the system 10 that the customer 12 was improperly billed for a past shipment based on an incorrect weight, the system allows the user to enter partial adjustment amounts to the related charges in the corresponding "ADJ AMOUNT" column. As may be understood from FIG. 4G, in this particular example, the user has adjusted the freight transaction charge ("TRANS") by seven dollars. In response to the user having entered this adjustment amount, the system, at Step 360, automatically updates any applicable taxes and surcharges. This can include, for example, an adjustment (e.g., seven cents) being made to a fuel surcharge (FSC) that is associated with the selected transaction. The system also updates the total amount of the overall adjustment in the "ADJ AMOUNT" column, and the total amount for each field in the "REMAINING BALANCE" column. Thus, in the example of FIG. 4G, the total adjustment amount comes to seven dollars and seven cents, and the total remaining balance for the selected transaction is nine dollars and thirty-seven cents.

Returning to Step 345, if the customer 12 disputes an entire charge, the user can key enter a reason code corresponding to an appropriate "full" adjustment. For example, if the customer's credit card was incorrectly charged for a package that was previously voided, the user, in one embodiment, would enter reason code "026—Billed for Voided Pacakge," as illustrated in FIG. 4H. In this case, the system would automatically populate the full amount for each of the related charges in the ADJ AMOUNT column, as may be understood from looking at FIG. 4H. In one embodiment, this step also includes performing full adjustments to any applicable taxes and surcharges, as shown. The amounts in the REMAINING BALANCE column are similarly updated to reflect the changes that have occurred in the ADJ AMOUNT column. In one embodiment, the system will not allow the user to over-write these fully adjusted amounts without changing the reason code.

Whether advancing from Step 350, for a system populated, full adjustment, or from Step 360, for a user populated adjustment, the system, at Step 365, allows the user to key enter additional information in free text format. FIG. 4I illustrates the type of free text information that can be entered in association with an adjustment request, according to one embodiment of the present invention. To continue with the previous example, FIG. 4I illustrates how the user can key enter an appropriate contact name, phone number and any relevant comments, such as "package should have been billed at 15 lbs." In one embodiment, a contact name and phone number is required to process the adjustment request. This is the type of information, for example, that would typically be provided by a customer 12 during the course of a user processing a credit card billing adjustment request via the telephone.

After all such information has been entered, the process proceeds to Step 370 where the adjustment request is submitted for processing and approval. In one embodiment, this can be accomplished by having the user press the "PFX" (Process Adjustment) key, which is listed in the bottom, left corner of the transaction adjustment window 430. In response to this action, the system prompts the user to "yes/no" confirm whether they would like to submit the adjustment request for processing. After submitting the adjustment request for processing, the user is then taken back to the transaction summary window 420, where, at Step 375, the system displays an updated listing of all transactions related to the originally selected (or key entered) TN 412.

As may be understood from FIG. 4J, the transaction summary window 420 now includes a new line item for the newly created credit card billing adjustment request (compare with FIG. 4D). In the particular example of FIG. 4J, this transaction is listed in the transaction type column (TRANS TYPE) as "FRT-CCA," indicating that the transaction is a credit card adjustment transaction that has been submitted against the corresponding freight (FRT) transaction listed immediately above. As with the other types of transactions listed in transaction summary window 420, the new line item corresponding to the newly created credit card adjustment transaction includes an amount (by which the related transaction has been adjusted), a date (on which the adjustment was created), and a type and number of the credit card to which the transaction applies. In one embodiment, to provide added security against fraud, the user again sees only the last four digits of the credit card number.

As may also be understood from looking at FIG. 4J, the line item associated with the newly created credit card adjustment transaction includes an ID field for identifying the user who last adjusted the transaction, a flag for indicating the status of the adjustment present transaction and a reason code for indicating why the adjustment transaction was performed. While an adjustment transaction is in pending status, as shown in FIG. 4J, the user can update, delete or approve the transaction depending on their authorization level. These and other aspects of the present invention are described below.

Editing an Existing Adjustment

Figure 5:
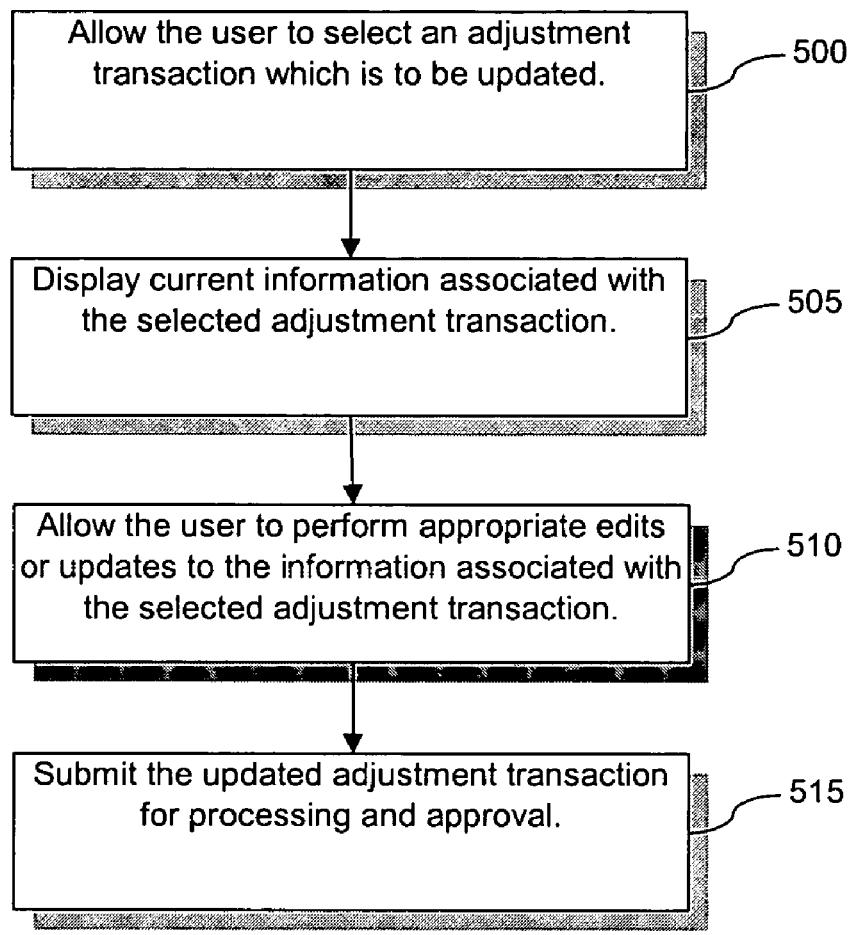
FIG. 5 shows a process flow diagram that illustrates the steps for updating or editing an existing credit card billing adjustment request in accordance with an embodiment of the present invention.

The following paragraphs describe the process of updating or editing an existing credit card billing adjustment request using the billing adjustment system 10. In particular, reference is now made to FIG. 5, which shows a process flow diagram that illustrates the steps by which a user can update or edit an existing adjustment request, and to FIGS. 6A-6B, which provide graphic illustrations of billing adjustment windows that can be used to carry out such process in accordance with a preferred embodiment of the present invention.

To update a particular adjustment transaction, the system, at Step 500, allows the user to select the transaction and presses enter. As depicted in FIG. 6A, the user can select a particular adjustment transaction by placing an "S" in the option ("O") column next to the transaction. In response to the user having selected a particular adjustment transaction, the system, at Step 505, displays a set of adjustment related information that is currently associated with the transaction. In one embodiment, the system executes Step 505 by displaying a transaction adjustment window 430 such as the transaction adjustment window shown in FIG. 6B. As may be understood from FIG. 6B, the transaction adjustment window 430 includes, in this example, much of the same information that was previously depicted in FIG. 4I. However, unlike FIG. 4I, FIG. 6B also includes additional information that can be found in the "STATUS," "ADJ DT" and "ADJ ID" fields. This information has been updated as a result of the adjustment creation process described above.

Within the transaction adjustment window 430, the user, at Step 510, can make changes or updates to any previously entered information. In particular, according to one embodiment, the user can perform updates to any of the following: adjustment amounts; reason for adjustment; contact information; and comments. After all changes have been made, the user can submit the adjustment request for processing, as described above. In particular, after all information updates have been entered, the process proceeds to Step 515, where the updated adjustment transaction is submitted for processing and approval. In one embodiment, this can be accomplished by having the user press the "PFX" (Process Adjustment) key shown at the bottom left corner of the screen. In response to this action, the system prompts the user to "yes/no" confirm whether they would like to submit the updated adjustment request for processing. The user is then taken back to the transaction summary window 420.

Upon completion of any updates or edits to the selected adjustment transaction, the transaction summary window 420 will appear much as it did in FIG. 6A, with the exception of any such changes being reflected in the applicable data fields associated with the transaction. For example, if changes have been made to the amount of the adjustment or the reason for the adjustment, these changes will be reflected in the appropriate data fields provided in the transaction summary window 420. Similarly, if the user who just performed the most recent update is an individual other than the user previously listed in the "LAST ADJ ID" column, then the system would update this information as well. On the other hand, until such time that an authorized user (or the system) approves, deletes or reverses the adjustment request, the status of the request will remain pending (PEND), as depicted in FIG. 6A.

Approving, Deleting and Reversing Existing Adjustments

Figure 7:
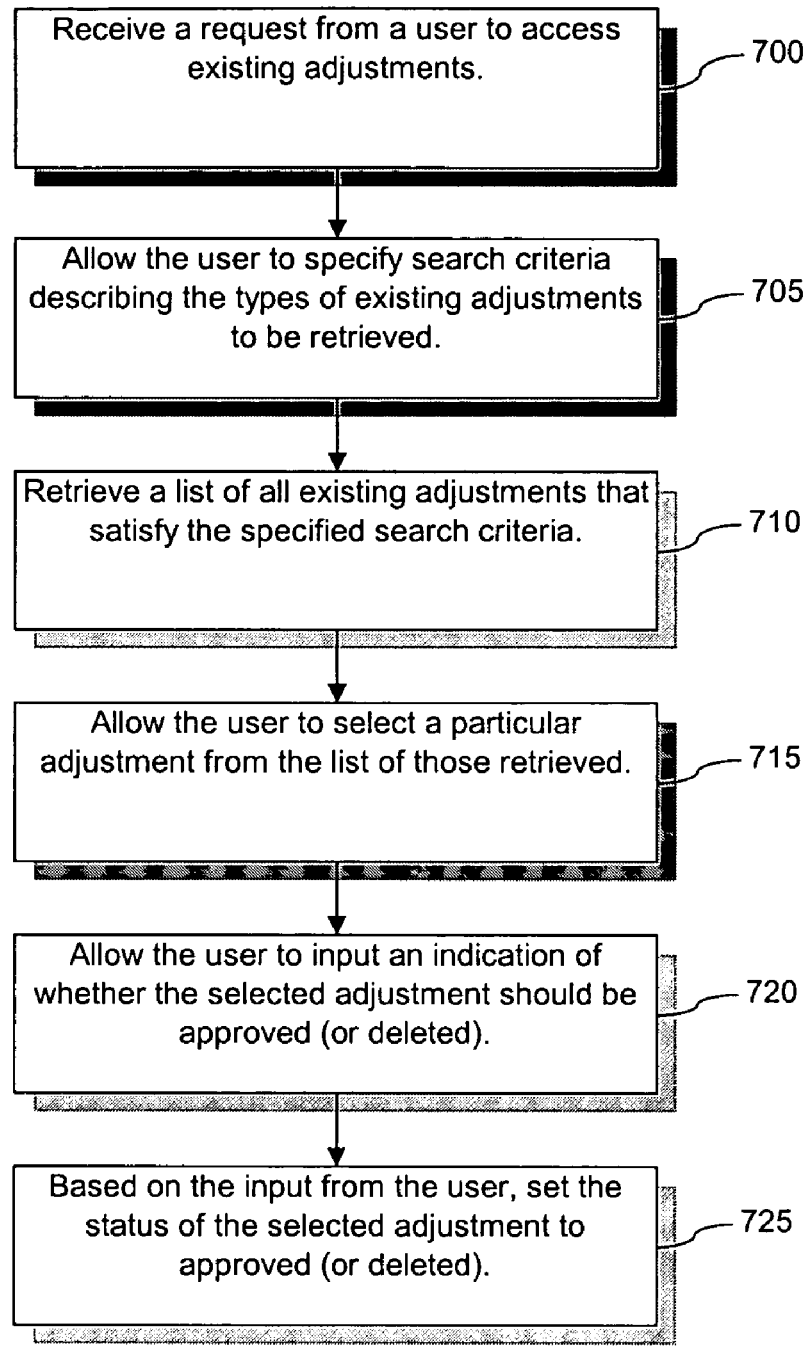
FIG. 7 shows a process flow diagram that illustrates the steps for approving or deleting an existing credit card billing adjustment request in accordance with an embodiment of the present invention.
Figure 8A:
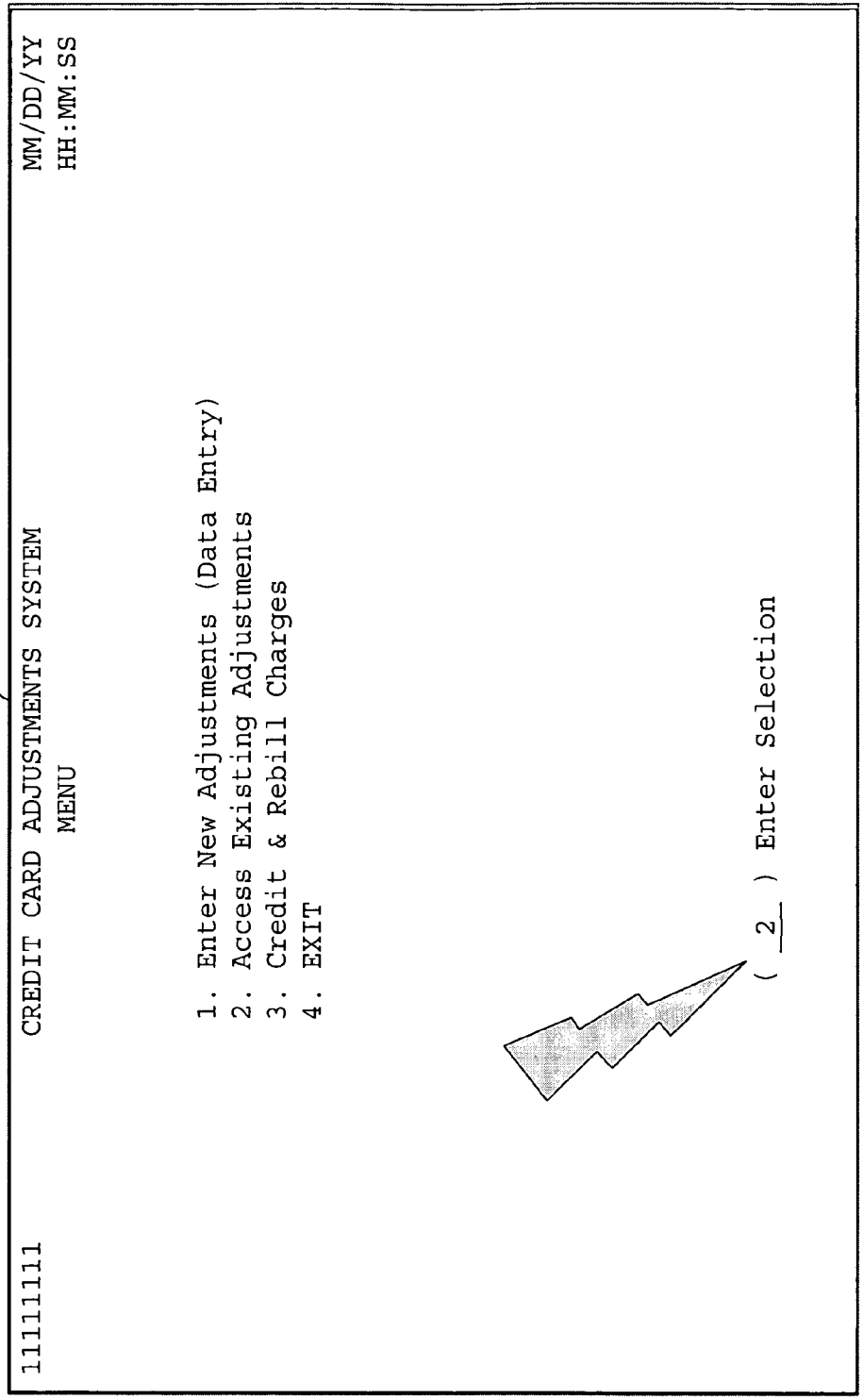

The following paragraphs describe the process of approving or deleting an existing credit card billing adjustment request using the billing adjustment system 10. In particular, reference is now made to FIG. 7, which shows a process flow diagram that illustrates the steps by which a user can approve or delete an existing credit card billing adjustment request, and to FIGS. 8A-8G, which provide graphic illustrations of billing adjustment windows that can be used to carry out such process in accordance with a preferred embodiment of the present invention.

In one embodiment, the approval process includes the ability to approve, delete, modify or reverse pending adjustments, and is restricted to authorized agents. In particular, the approval process allows for the assignment of authorization thresholds by security level, which can include the following levels: administrative—no approval rights; supervisor —limited approval rights; and manager—unlimited approval rights. The authorization threshold assigned to each user of the system 10 can be stored in the approval authorization database 25. The approval process further includes the ability to set an automatic approval threshold amount for each country, meaning that the system will automatically approve any adjustment that falls below this threshold. This amount will typically be in the currency of the country where the adjustment is being processed. Additional aspects of the approval process will now be described in detail.

The process begins at Step 700, where the system receives a request from a user to access existing adjustments. In a preferred embodiment of the invention, the system displays a menu window 400 such as the menu window shown in FIG. 8A. As may be understood from this figure, such a window includes an option to access existing adjustments, which in this case is option "2." After completing Step 700, by entering "2" and pressing enter, the system proceeds to Step 705 where it allows the user to specify search criteria describing the types of existing adjustments to be retrieved. In the preferred embodiment of the invention, the system accomplishes this by providing the user with an existing adjustments window 440 such as the existing adjustments window shown in FIG. 8B.

Within the existing adjustments window 440, the user has the ability to search or filter all existing adjustment transactions by an assortment of search criteria. In the particular embodiment of FIG. 8B, the assortment of search criteria made available to the user includes: Region District (PR RRDD); Status of Pending (P), Approved (A) or Deleted (D) adjustments; the dollar limit ($Limit) the user is able to approve ($) or all transactions (A) including those the user may not be authorized to approve; and the ID of the user that created or last updated the adjustment (ADJ ID). The user can also search for existing adjustments based on the tracking number 412 of a specific adjustment, or a date range. To look for adjustments on a particular date, the "From" and "To" dates would need to be the same.

To narrow the search, the user can enter one or multiple search criteria. Consider the following example depicted in FIG. 8C. Here the user has provided input for three of the possible search criteria described above. Specifically, in response to the user having entered the three search criteria shown, the system, at Step 710, retrieves a list of all existing adjustments in Region District "2010" that are in Pending ("P") status with a dollar amount ("$") that the user has the ability to approve. In this case, only one item was returned. However, if more items are returned the user can refine their search by adding additional filter criteria, or they can scroll up or down using the "PF7" and "PF8" keys listed below. In the embodiment shown, the user will know how many pages of retrieved adjustments are available by the page count provided in the lower right corner of the existing adjustments window 440.

At Step 715, the system allows the user to select a particular adjustment from the list of those retrieved and, at Step 720, the user can input an indication of whether the selected adjustment should be approved or deleted. In the preferred embodiment, an authorized user can approve or delete an existing adjustment in several different ways. For example, from within the existing adjustments window 440, the user can concurrently select (Step 715) and approve (Step 720) an adjustment by placing an "A" in the option ("O") column next to the transaction. Or, the user can concurrently select (Step 715) and delete (Step 720) an adjustment from within the existing adjustments window 440 by placing a "D" in the option ("O") column next to the transaction. Alternatively, if, at any time, the user is within the transaction summary window 420 (see FIG. 6A), the user can similarly approve a pending adjustment by placing an "A" in the option ("O") column next to the transaction, and delete a pending adjustment by placing a "D" in the option ("O") column next to the transaction.

Returning to FIG. 8C, the user could also first select the particular adjustment (Step 715) by placing an "S" in the option ("O") column next to the transaction. In this case, the user would be taken from the existing adjustments window 440 back to the transaction adjustment window 430 depicted in FIG. 6B. As may be understood by referring back to FIG. 6B, the user could then approve the adjustment (Step 720) by using the "PFY=APPROVE" key shown at the bottom of the screen. Similarly, the user could delete the adjustment (Step 720) by using the "PFZ=DELETE" key shown at the bottom of the screen.

After the user has indicated whether the selected adjustment should be approved, deleted, etc., the system, at Step 725, sets the status of the selected adjustment transaction in accordance with the input provided by the user. This change in status would be reflected throughout the system. For instance, if the user (or some other user) was to then perform another search of all existing adjustments in Region District "2010" that are in Approved ("A") status with a dollar amount ("$") that the user has the ability to approve, the system would return a list of existing adjustments as shown in FIG. 8D. In comparison to FIG. 8C, note how the status (CURR STAT) of the existing adjustment has changed from pending (PEND) to approved (APPR). As may be understood from FIG. 8E, the transaction adjustment window 430 will also reflect any changes that have occurred during the approval process. For example, note how in comparison to FIG. 6B the approved by (APRV BY) and approved date (APRV DATE) information is now populated.

These changes would similarly be reflected in the transaction summary window 420, as shown in FIG. 8F. When compared with FIG. 6A, note how the status of the existing adjustment has changed from pending (PEND) to approved (APPR). Another feature provided by in transaction summary window 420 is the ability to display the user ID of the user who approved the transaction. In particular, using the "PFV=APRV ID" key, shown at the bottom of FIG. 8F, will switch the "Last Adjusted By ID" column to show the "Approved By ID" of the user who approved the transaction. A graphic illustration of this is provided in FIG. 8G, where the "LAST ADJ ID" column has been changed to the "APPR ID" column. Note also that the "PFV" key label at the bottom of the screen has been changed to "PFV=LAST ADJ ID" to show the ability to switch back to the "Last Adjusted By ID."

As described above, when a user determines that an adjustment was created erroneously and that adjustment is still pending, the user can delete it. However, in the event that an adjustment was created erroneously and then approved before such error was discovered, the system provides the user with the ability to "reverse" an adjustment. In a preferred embodiment, a reversal is performed in much the same way as a "delete" operation is performed for a pending transaction, except that it occurs subject to the following rules: a new transaction would be created with the exact dollar amount (amount would be a debit) as the original transaction; the new transaction would be created with the same reason code as the original transaction; the transaction would be non-editable; and the new transaction would be in "pending" status awaiting approval by an authorized user (or the system) just like any other transaction.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

That which is claimed:

1. A system for processing a billing adjustment request related to one or more past shipping charges that were applied to a credit card used by a customer of a carrier, said system comprising:
    a database for storing information related to past shipping charges;
    a display device for displaying billing related information to a user via a graphical user interface;
    an input device for allowing the user to input information via the graphical user interface; and
    one or more computers in communication with said input device, said display device, and said database, said one or more computers configured for:
        (1) allowing the user to enter a reference number that references at least one shipment associated with the customer;
        (2) retrieving from said database a list of one or more past credit card transactions that are associated with said reference number;
        (3) allowing the user to select a transaction from the list of one or more past credit card transactions;
        (4) allowing the user to enter a reason input that identifies a reason for making a billing adjustment request for the selected transaction;
        (5) based at least in part on said reason input, (a) allowing the user to enter an adjustment amount, the adjustment amount being an amount by which the transaction amount of the selected transaction is requested to be reduced pursuant to the billing adjustment request or (b) automatically setting the adjustment amount equal to the full transaction amount of the selected transaction;
        (6) submitting the billing adjustment request in association with the selected transaction, wherein the billing adjustment request comprises applying the adjustment amount to a past transaction amount of the selected transaction, the past transaction amount having been previously applied to said credit card; and
        (7) transmitting the adjustment amount in association with the credit card number of said credit card to a credit card company that is responsible for handling charges applied to said credit card.

2. The system of claim 1, wherein said reference number is a tracking number that identifies a particular shipment associated with the customer.

3. The system of claim 2, wherein said one or more computers are further configured for aggregating all adjustment amounts that are associated with the same tracking number, and that occur on the same date and are applied to the same credit card number, as one invoice item that is transmitted to said credit card company.

4. The system of claim 1, wherein said reference number is a credit card notification number that identifies a list of one or more past shipping charges that relate to one or more shipments associated with the customer, and that have been applied to said credit card by said carrier during a particular time period.

5. The system of claim 4, wherein said one or more computers are further configured for aggregating all adjustment amounts that are associated with the same credit card notification number, and that occur on the same date and are applied to the same credit card number, as one invoice item that is transmitted to said credit card company.

6. The system of claim 1, wherein the transaction amount of the selected transaction comprises one or more itemized shipping charges that are associated with the selected transaction, and the adjustment amount comprises one or more individual offset amounts that are applied, respectively, to the one or more itemized shipping charges.

7. The system of claim 6, wherein each of the one or more individual offset amounts can be any amount less than or equal to the corresponding itemized shipping charge to which the offset amount is applied.

8. The system of claim 1, wherein said reason input indicates that the full transaction amount of the selected transaction was billed in error to said credit card, and that said transaction amount is to be re-billed to an alternate payment source.

9. The system of claim 8, wherein the alternate payment source is another credit card, different from said credit card to which said transaction amount was previously billed.

10. The system of claim 8, wherein the alternate payment source is a customer account number that the customer maintains with the carrier.

11. The system of claim 8, wherein said one or more computers are further configured for determining whether there exists any pending billing adjustment requests that are associated with the selected transaction, and if so, disallowing the current billing adjustment request.

12. The system of claim 1, wherein said one or more computers are further configured for displaying, in association with each of the one or more past credit card transactions, a transaction type, a transaction amount and a credit card number of a credit card to which the corresponding transaction amount was previously billed.

13. The system of claim 12, wherein each credit card number displayed in association with a past credit card transaction is displayed such that only a portion of the number is revealed to the user for added security against credit card fraud.

14. The system of claim 1, wherein said one or more computers are further configured for storing the billing adjustment request in an adjustment transaction database for awaiting approval by an authorized person.

15. The system of claim 14, wherein said one or more computers are further configured for automatically approving the billing adjustment request if the adjustment amount is less than a predetermined approval threshold.

16. The system of claim 1, wherein said one or more computers are further configured for automatically re-computing any applicable taxes or surcharges that are affected by the billing adjustment request.

17. A method of processing a billing adjustment request related to one or more past shipping charges that were applied to a credit card used by a customer of a carrier, said method comprising the steps of:
   (1) allowing a user to enter, via an electronic input device, a reference number that references at least one shipment associated with the customer;
   (2) retrieving from a database, via a computing device, a list of one or more past credit card transactions that are associated with said reference number;
   (3) allowing the user to select, via the electronic input device, a transaction from the list of one or more past credit card transactions;
   (4) allowing the user to enter a reason input that identifies a reason for making a billing adjustment request for the selected transaction;
   (5) based at least in part on said reason input, (a) allowing the user to enter an adjustment amount, the adjustment amount being an amount by which the transaction amount of the selected transaction is requested to be reduced pursuant to the billing adjustment request or (b) automatically setting the adjustment amount equal to the full transaction amount of the selected transaction;
   (6) submitting, via the computing device, the billing adjustment request in association with the selected transaction, wherein the billing adjustment request comprises applying the adjustment amount to a past transaction amount of the selected transaction, the past transaction amount having been previously applied to said credit card; and
   (7) transmitting, via the computing device, the adjustment amount in association with the credit card number of said credit card to a credit card company that is responsible for handling charges applied to said credit card.

18. The method of claim 17, wherein said reference number is a tracking number that identifies a particular shipment associated with the customer.

19. The method of claim 18, further comprising aggregating all adjustment amounts that are associated with the same tracking number, and that occur on the same date and are applied to the same credit card number, as one invoice item that is transmitted to said credit card company.

20. The method of claim 17, wherein said reference number is a credit card notification number that identifies a list of one or more past shipping charges that relate to one or more shipments associated with the customer, and that have been applied to said credit card by said carrier during a particular time period.

21. The method of claim 20, further comprising aggregating all adjustment amounts that are associated with the same credit card notification number, and that occur on the same date and are applied to the same credit card number, as one invoice item that is transmitted to said credit card company.

22. The method of claim 17, wherein the transaction amount of the selected transaction comprises one or more itemized shipping charges that are associated with the selected transaction, and the adjustment amount comprises one or more individual offset amounts that are applied, respectively, to the one or more itemized shipping charges.

23. The method of claim 22, wherein each of the one or more individual offset amounts can be any amount less than or equal to the corresponding itemized shipping charge to which the offset amount is applied.

24. The method of claim 17, wherein said reason input indicates that the full transaction amount of the selected transaction was billed in error to said credit card, and that said transaction amount is to be re-billed to an alternate payment source.

25. The method of claim 24, wherein the alternate payment source is another credit card, different from said credit card to which the transaction amount was previously billed.

26. The method of claim 24, wherein the alternate payment source is a customer account number that the customer maintains with the carrier.

27. The method of claim 24, further comprising determining whether there exists any pending billing adjustment requests that are associated with the selected transaction, and if so, disallowing the current billing adjustment request.

28. The method of claim 17, further comprising displaying, in association with each of the one or more past credit card transactions, a transaction type, a transaction amount and a credit card number of a credit card to which the corresponding transaction amount was previously billed.

29. The method of claim 28, wherein each credit card number displayed in association with a past credit card transaction is displayed such that only a portion of the number is revealed to the user for added security against credit card fraud.

30. The method of claim 17, further comprising storing the billing adjustment request in an adjustment transaction database for awaiting approval by an authorized person.

31. The method of claim 30, further comprising automatically approving the billing adjustment request if the adjustment amount is less than a predetermined approval threshold.

32. The method of claim 17, further comprising automatically re-computing any applicable taxes or surcharges that are affected by the billing adjustment request.

* * * * *

UNITED STATES PATENT AND TRADEMARK OFFICE
CERTIFICATE OF CORRECTION

PATENT NO. : 7,630,938 B2  
APPLICATION NO. : 11/095141  
DATED : December 8, 2009  
INVENTOR(S) : Torpin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Second Day of November, 2010

David J. Kappos  
*Director of the United States Patent and Trademark Office*

UNITED STATES PATENT AND TRADEMARK OFFICE
CERTIFICATE OF CORRECTION

PATENT NO. : 7,630,938 B2  Page 1 of 1
APPLICATION NO. : 11/095141
DATED : December 8, 2009
INVENTOR(S) : Torpin et al.

It is certified that error appears in the above-identified patent and that said Letters Patent is hereby corrected as shown below:

Column 17

Line 65, "allowing" should read --allowing--

Signed and Sealed this

Twenty-third Day of November, 2010

David J. Kappos
*Director of the United States Patent and Trademark Office*